(12) United States Patent
Kang et al.

(10) Patent No.: US 12,312,009 B2
(45) Date of Patent: May 27, 2025

(54) FRONT VEHICLE BODY STRUCTURE

(71) Applicants: Hyundai Motor Company, Seoul (KR); Kia Corporation, Seoul (KR)

(72) Inventors: ChangHak Kang, Hwaseong-si (KR); Chan Woong Jeon, Incheon (KR); Chulhee Heo, Hwaseong-si (KR); HaeHoon Lee, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 409 days.

(21) Appl. No.: 17/880,743

(22) Filed: Aug. 4, 2022

(65) Prior Publication Data

US 2023/0202576 A1    Jun. 29, 2023

(30) Foreign Application Priority Data

Dec. 27, 2021    (KR) .......................... 10-2021-0188455

(51) Int. Cl.
| | | |
|---|---|---|
| *B62D 25/08* | (2006.01) | |
| *B60N 2/015* | (2006.01) | |
| *B62D 25/14* | (2006.01) | |
| *B62D 25/20* | (2006.01) | |
| *B62D 25/04* | (2006.01) | |

(52) U.S. Cl.
CPC ............ *B62D 25/08* (2013.01); *B60N 2/015* (2013.01); *B62D 25/145* (2013.01); *B62D 25/2018* (2013.01); *B62D 25/2036* (2013.01); *B62D 25/2045* (2013.01); *B62D 25/04* (2013.01)

(58) Field of Classification Search
CPC .... B60N 2/015; B62D 25/145; B62D 25/084; B62D 25/081; B62D 25/025; B62D 25/2036; B62D 25/045; B62D 25/2045; B60K 11/04
USPC ................................... 296/198, 204, 203.02
See application file for complete search history.

(56) References Cited

U.S. PATENT DOCUMENTS

| | | | | |
|---|---|---|---|---|
| 9,004,535 | B2* | 4/2015 | Wu ..................... | B62D 25/2009 180/311 |
| 9,227,665 | B2* | 1/2016 | Mildner ............... | B62D 25/082 |
| 10,106,206 | B1* | 10/2018 | Baccouche ........... | B62D 25/04 |
| 11,472,492 | B2* | 10/2022 | Song .................... | B62D 27/023 |
| 11,591,026 | B2* | 2/2023 | Song .................... | B62D 27/023 |
| 11,772,708 | B2* | 10/2023 | Song .................... | B62D 21/152 296/187.09 |
| 11,873,028 | B2* | 1/2024 | An ........................ | B62D 25/08 |
| 11,939,003 | B2* | 3/2024 | Kang .................. | B62D 25/2027 |
| 12,103,595 | B2* | 10/2024 | Jeon ..................... | B62D 25/081 |
| 2021/0213859 | A1* | 7/2021 | Takamura ............... | B60N 2/80 |
| 2023/0202576 | A1* | 6/2023 | Kang .................. | B62D 25/2018 296/193.02 |
| 2023/0211831 | A1* | 7/2023 | Jeon ..................... | B62D 25/145 296/70 |

(Continued)

*Primary Examiner* — Jason S Morrow
(74) *Attorney, Agent, or Firm* — Slater Matsil, LLP (57) ABSTRACT

An embodiment front vehicle body structure of a vehicle body is provided. The vehicle body includes an underbody and an upper body coupled to the underbody, and the front vehicle body structure includes a pair of front wheel arch members respectively disposed on both sides of a front part of the upper body according to a vehicle width direction and a front seat mount unit including a front seat crossmember extending along the vehicle width direction and coupled to each of the front wheel arch members.

20 Claims, 10 Drawing Sheets

(56) References Cited

U.S. PATENT DOCUMENTS

| | | | |
|---|---|---|---|
| 2023/0331310 A1* | 10/2023 | Lee | B62D 25/04 |
| 2024/0198916 A1* | 6/2024 | Kang | B60R 7/12 |
| 2024/0294060 A1* | 9/2024 | Harsch | B62D 21/03 |

* cited by examiner

FRONT VEHICLE BODY STRUCTURE

CROSS-REFERENCE TO RELATED APPLICATIONS

This application claims the benefit of Korean Patent Application No. 10-2021-0188455, filed on Dec. 27, 2021, which application is hereby incorporated herein by reference.

TECHNICAL FIELD

An embodiment of the present invention relates to a vehicle body of a vehicle.

BACKGROUND

Recently, the vehicle industry has been introducing a new concept of future mobility vision for realizing a human-centered and dynamic future city. One of these future mobility solutions is a purpose-built vehicle (PBV) as a purpose-based mobility.

An example of a PBV may be an environment-friendly mobile vehicle that provides various customized services to passengers during a period in which they travel to their destination on the ground. The PBV may also travel on a predetermined path and perform platooning of an optimal path for each situation by using an electric vehicle (EV)-based artificial intelligence and unmanned autonomous driving. Furthermore, the PBV may also be used as a taxi (also called 'a robo-taxi') that moves to a destination of an occupant in an unmanned autonomous driving method.

For this purpose, the PBV is manufactured in a form of a box with a large interior space. In addition, the PBV has windshield glass and a cowl at the front of the vehicle body to provide a spacious interior space. Here, the vehicle body of the PBV includes an underbody (also referred to as a rolling chassis or a skateboard in the industry) and an upper body assembled to the underbody.

For the vehicle body of such a PBV, it is most important to secure the connection robustness of the members forming the front part of the upper body. In addition, as the upper body is configured in the box shape, the vehicle body of the PBV has problems in that the front skeletal hardness of the upper body is weak and the impact absorption performance during a front collision is weak.

The above information disclosed in this background section is only for enhancement of understanding of the background of the invention, and therefore it may contain information that does not form the prior art that is already known to a person of ordinary skill in the art.

SUMMARY

An embodiment of the present invention relates to a vehicle body of a vehicle. Particular embodiments relate to a front vehicle body structure of a purpose-built vehicle (PBV).

Embodiments of the present invention provide a front vehicle body structure that may increase hardness and strength of the front part of the upper body and improve front impact performance.

A front vehicle body structure according to an embodiment of the present invention is a front vehicle body structure of a vehicle including an underbody and an upper body coupled to the underbody and that may include a front wheel arch member respectively disposed on both sides according to the vehicle width direction of the front part of the upper body and a front seat mount unit including a front seat crossmember coupled to each of the front wheel arch members along a vehicle width direction.

In the front vehicle body structure according to an embodiment of the present invention, the front seat mount unit may be installed on the front part of the upper body to mount at least one front seat facing the rear of the vehicle.

In the front vehicle body structure according to an embodiment of the present invention, each of the front wheel arch members may be disposed on the upper side of the front tire wheel respectively coupled to both sides according to the vehicle width direction of the front part of the underbody.

In the front vehicle body structure according to an embodiment of the present invention, each front wheel arch member may be directly connected to the front end of a side sill respectively disposed on both sides along the vehicle width direction of the front part of the upper body along the front and rear direction of the vehicle body.

In the front vehicle body structure according to an embodiment of the present invention, each of the front wheel arch members may be formed of a closed cross-section by a wheel arch outer member and a wheel arch inner member that are connected to each other.

In the front vehicle body structure according to an embodiment of the present invention, the front seat mount unit may include a rear seat crossmember coupled along the vehicle width direction to the front part of the center floor panel provided on the upper body.

In the front vehicle body structure according to an embodiment of the present invention, the rear seat crossmember may be coupled to the inner surface of the side sill disposed on each side along the vehicle width direction of the front part of the upper body.

In the front vehicle body structure according to an embodiment of the present invention, the front seat mount unit may include a plurality of seat mounting brackets coupled to the upper surface of the rear seat crossmember to extend to a predetermined height and disposed to be spaced apart along the vehicle width direction.

The front vehicle body structure according to an embodiment of the present invention may further include a dash panel that is coupled to each of the front wheel arch members and that has the upper surface to which the front seat crossmember is coupled.

The front vehicle body structure according to an embodiment of the present invention may further include a dash crossmember coupled to the lower surface of the dash panel and coupled along the vehicle width direction to each of the front wheel arch members.

The front vehicle body structure according to an embodiment of the present invention may further include a seat belt crossmember coupled through a reinforcing member to a front cowl support side member disposed along the vehicle body front and rear directions on both sides along the vehicle width direction of the front part of the upper body and coupled along the vehicle width direction with the upper part of the dash panel.

The front vehicle body structure according to an embodiment of the present invention may further include a cowl panel coupled to each front cowl support side member through each reinforcing member and coupled to the upper part of the seat belt crossmember.

In the front vehicle body structure according to an embodiment of the present invention, the seat belt mounting space opened upward may be formed on the seat belt crossmember.

In the front vehicle body structure according to an embodiment of the present invention, a seat belt retractor may be installed to the seat belt mounting space through a seat belt mount hole formed in the cowl panel.

Embodiments of the present invention may secure the hardness and strength of the front part of the upper body and improve NVH and R&H performance, and front impact performance of the PBV with a rear view type of front seat mounted on the front part of the upper body.

Further, effects that can be obtained or expected from embodiments of the present invention are directly or suggestively described in the following detailed description. That is, various effects expected from embodiments of the present invention will be described in the following detailed description.

BRIEF DESCRIPTION OF THE DRAWINGS

The drawings are provided for reference in describing embodiments of the present invention, and the spirit of the present invention should not be construed only by the accompanying drawings.

The following reference identifiers may be used in connection with the accompanying drawings to describe exemplary embodiments of the present disclosure.

| | |
|---|---|
| 1: vehicle body | 3: underbody |
| 3a: front part of underbody | 5: upper body |
| 5a: front part of upper body | 7: front tire wheel |
| 9: front seat | 10: front wheel arch member |
| 11: wheel arch outer member | 13: wheel arch inner member |
| 15: closed cross-section | 20: side sill |
| 21: sill outer member | 23: sill inner member |
| 30: front seat mount unit | 31: front seat crossmember |
| 33: rear seat crossmember | 35: seat mounting bracket |
| 37: center floor panel | 50: dash panel |
| 60: dash crossmember | 70: seat belt crossmember |
| 71: front cowl support side member | |
| 73: reinforcing member | 75: seat belt mounting space |
| 80: cowl panel | 81: seat belt mount hole |
| 90: seat belt retractor | 100: front vehicle body structure |

It should be understood that the above-referenced drawings are not necessarily to scale, presenting a somewhat simplified representation of various preferred features illustrative of the basic principles of the disclosure. The specific design features of embodiments of the present disclosure, including, for example, specific dimensions, orientations, locations, and shapes, will be determined in part by the particular intended application and use environment.

DETAILED DESCRIPTION OF ILLUSTRATIVE EMBODIMENTS

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

The terminology used herein is for the purpose of describing particular embodiments only and is not intended to be limiting of the present disclosure. As used herein, singular forms are intended to include plural forms as well, unless the context clearly indicates otherwise.

As used herein, the term "comprises" and/or "comprising" refers to the presence of specified features, integers, steps, acts, elements, and/or components, but it should also be understood that it does not exclude a presence or an addition of one or more other features, integers, steps, acts, components, and/or groups thereof. As used herein, the term "and/or" includes any one or all combinations of one or more related items. The term "coupled" denotes a physical relationship between two components in which components are directly connected to each other or are indirectly connected through one or more intermediary components, for example, by welding, self-piercing rivets (SPR), flow drill screws (FDS), structural adhesives, and the like.

The terms "vehicle", "of a vehicle", "automobile", or other similar terms used herein are generally used to cover various vehicles such as passenger vehicles including sports cars, sport utility vehicles (SUVs), buses, trucks, commercial vehicles, and the like, and cover hybrid vehicles, electric vehicles, hybrid electric vehicles, fuel cell electric vehicles, and other alternative fuel vehicles (i.e., vehicles driven by a fuel derived from resources other than petroleum).

Hereinafter, embodiments of the present invention will now be described in detail with reference to accompanying drawings.

Figure 1:
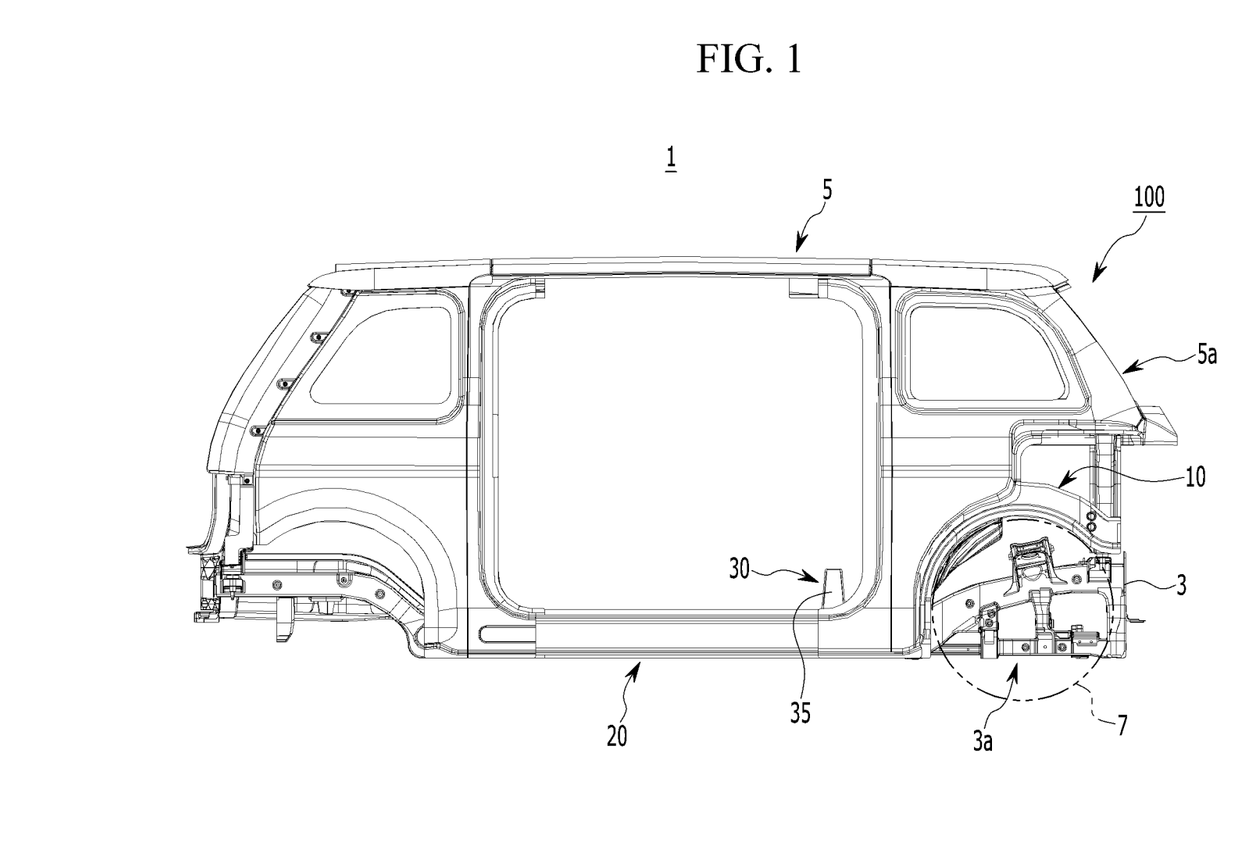
FIG. 1 is a view showing an example of a vehicle body of a PBV to which a front vehicle body structure according to an embodiment of the present invention is applied.

FIG. 1 is a view showing an example of a vehicle body of a PBV to which a front vehicle body structure according to an embodiment of the present invention is applied.

Referring to FIG. 1, the front vehicle body structure 100 according to an embodiment of the present invention may be applied to a vehicle body 1 of a purpose built vehicle (hereinafter referred to as a 'PBV') in one example.

The PBV may be defined as an environment-friendly vehicle that is electric vehicle-based and provides a customized service for passengers while traveling to a destination. In one example, the PBV may be a box-type design vehicle (e.g., a robo-taxi vehicle or a hailing vehicle) having a large interior space to move to the destination of the passenger in an unmanned autonomous driving manner.

The vehicle body 1 of such a PBV includes a skateboard-type underbody 3 (to those skilled in the art it is usually referred to as 'a rolling chassis') and an upper body 5 assembled to the underbody 3.

The underbody 3 may be provided as a chassis frame on which a battery assembly (not shown) may be mounted. In addition, the upper body 5 is a body in white (BIW) body coupled to the underbody 3, and may include a cabin.

In the present specification, for example, a reference direction for describing constituent elements may be set to be a vehicle body front and rear direction (e.g., a vehicle body length direction), a vehicle width direction, and a perpendicular direction.

"Upper end portion", "upper portion", "upper end", or "upper portion surface" of a component indicates an end portion, an upper portion, an end, or a surface of the component that is positioned relatively higher in the drawing, and "lower end portion", "lower portion", "lower end", or "lower portion surface" of a component indicates an end portion, a lower portion, an end, or a surface of the component that is positioned relatively lower in the drawing.

"End" (for example, one end, another end, or the like) of a component indicates an end of the component in any direction, and "end portion" (for example, one end portion, another end portion, or the like) of a component indicates a certain part of the component including the end.

The front vehicle body structure 100 according to an embodiment of the present invention includes a structure that may increase bonding hardness and connection robustness of the members forming the front part 5a of the upper body 5.

Figure 2:
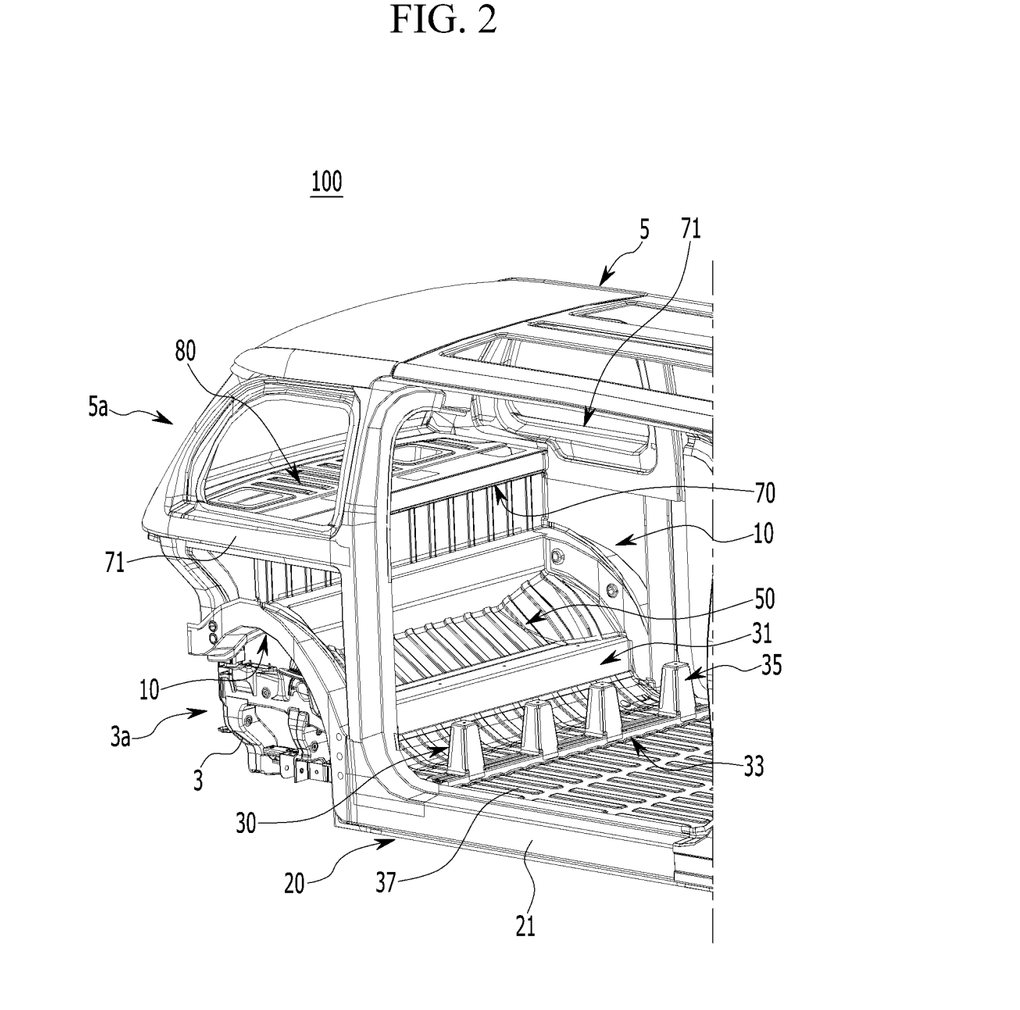
FIG. 2 and FIG. 3 are perspective views showing a front vehicle body structure according to an embodiment of the present invention.
Figure 3:
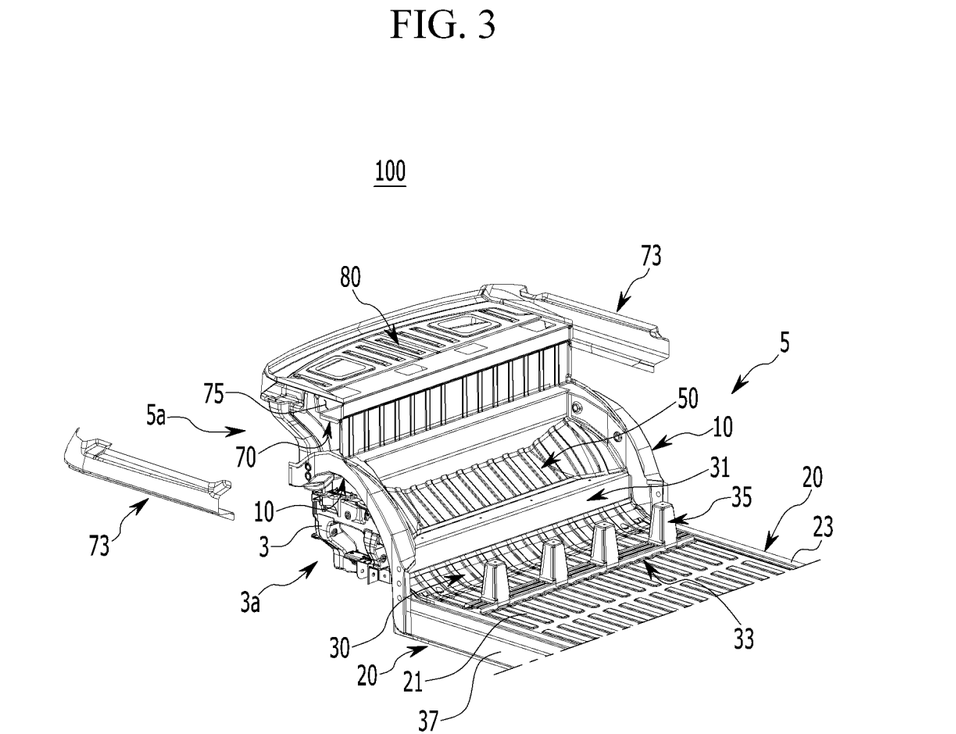
Figure 4:
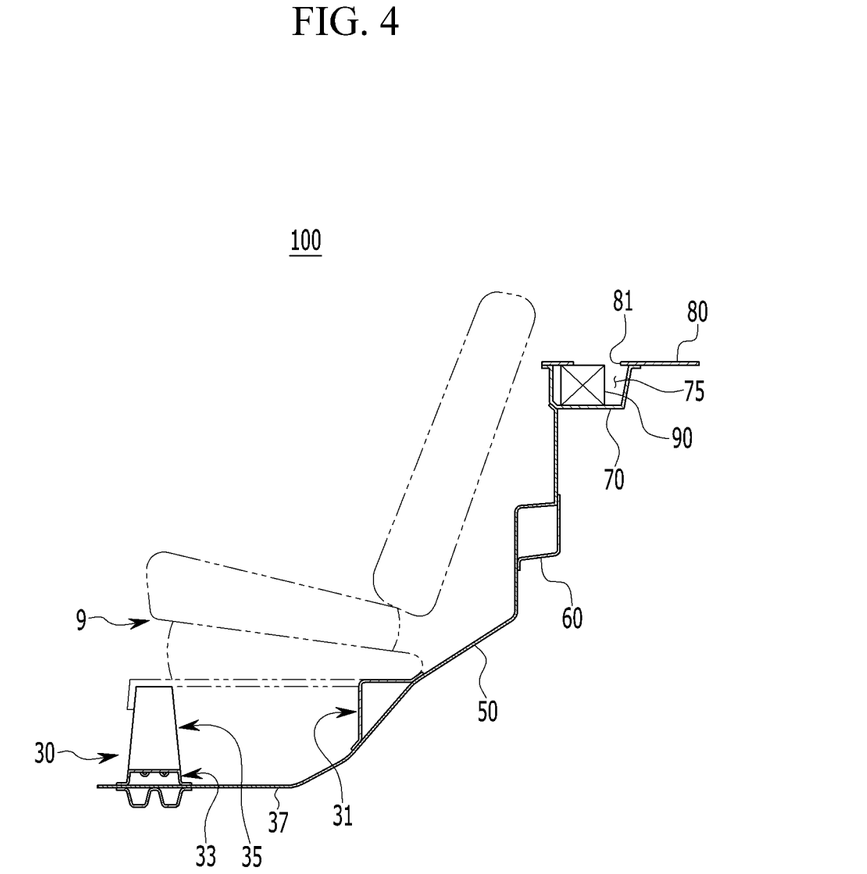
FIG. 4 is a cross-sectional view showing a front vehicle body structure according to an embodiment of the present invention.

FIG. 2 and FIG. 3 are perspective views showing a front vehicle body structure according to an embodiment of the present invention, and FIG. 4 is a cross-sectional view showing a front vehicle body structure according to an embodiment of the present invention.

Referring to FIG. 1 to FIG. 4, a front vehicle body structure 100 according to an embodiment of the present invention basically includes a front wheel arch member 10 and a front seat mount unit 30.

In an embodiment of the present invention, the front wheel arch member 10 is to ensure the connection robustness and the connecting hardness according to the vehicle body front and rear directions of the front part 5a of the upper body 5. And, the front wheel arch member 10 is configured to distribute the load applied to the front part 5a of the upper body 5 in the front and rear directions of the vehicle body.

Here, the upper body 5 includes side sills 20 disposed on both sides along the vehicle width direction, respectively. Each of the side sills 20 is disposed along the vehicle body front and rear directions. Each of the side sills 20 may be formed in a closed cross-section (not shown) by a sill outer member 21 and a sill inner member 23 connected to each other, as is well known to those skilled in the art.

The front wheel arch member 10 is disposed on both sides according to the vehicle width direction of the front part 5a of the upper body 5, respectively. Each of the front wheel arch members 10 is directly connected to the front end part of each side sill 20 in the front part 5a of the upper body 5 along the vehicle body front-rear direction.

Each of the front wheel arch members 10 is provided as a curved member in a rounded form (e.g., an arch) along the front and rear directions of the vehicle body. Here, each of the front wheel arch members 10 is disposed on the upper side of the front tire wheels 7 respectively coupled to both sides along the vehicle width direction of the front part 3a of the underbody 3. Each of the front wheel arch members 10 is designed to avoid the rotation trajectory of each front tire wheel 7.

Figure 5:
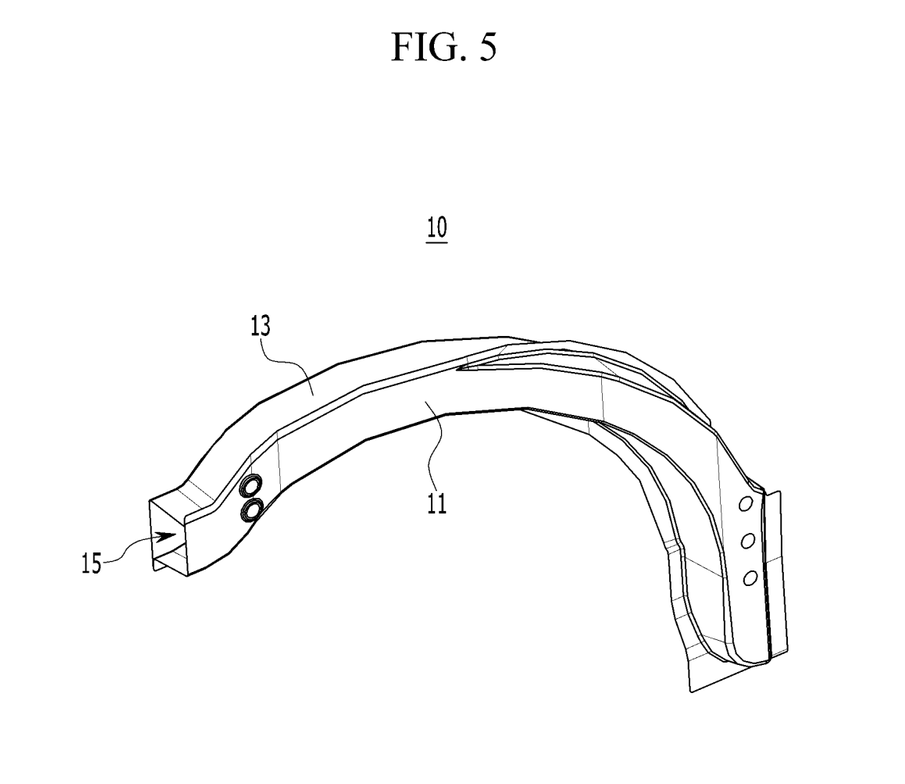
FIG. 5 is a view showing a front wheel arch member applied to a front vehicle body structure according to an embodiment of the present invention.

Each of the front wheel arch members 10, as shown in FIG. 5, may be formed of a closed cross-section 15 by a wheel arch outer member 11 and a wheel arch inner member 13 coupled to each other. Each of the closed cross-sections 15 of these front wheel arch members 10 may be connected to the closed cross-section (not shown) of each of the side sills 20.

In an embodiment of the present invention, the front seat mount unit 30 is configured to mount at least one front seat 9 (hereinafter, referring to FIG. 4) to the front part 5a of the upper body 5. Furthermore, the front seat mount unit 30 is designed to mount at least one front seat 9 with the front part facing the rear direction (e.g., a seat of a rear view type) to the front part 5a of the upper body 5. The front seat mount unit 30 is installed on the front part 5a of the upper body 5.

Figure 6:
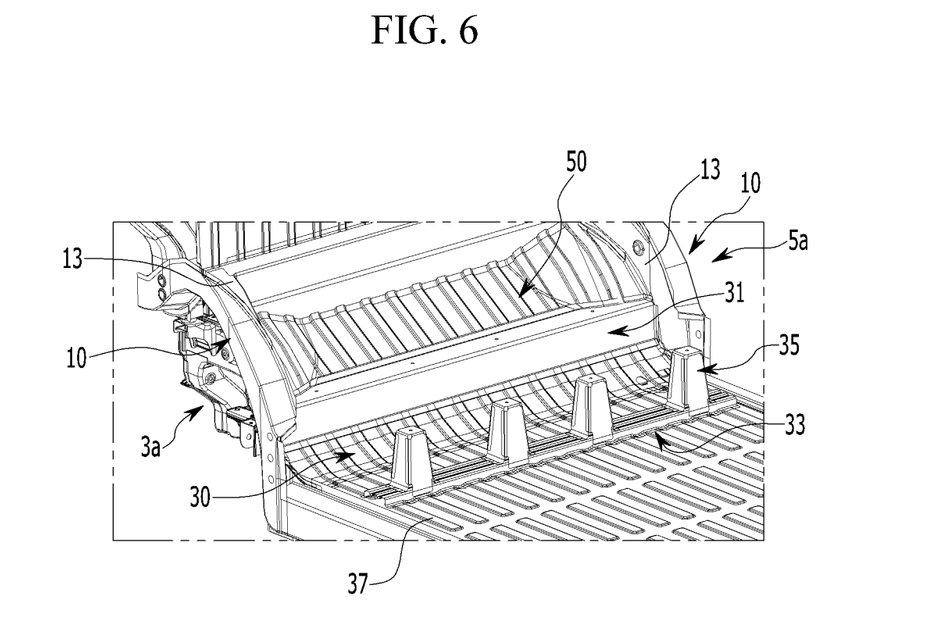
FIG. 6 and FIG. 7 are views showing a front seat mount unit applied to a front vehicle body structure according to an embodiment of the present invention.
Figure 7:
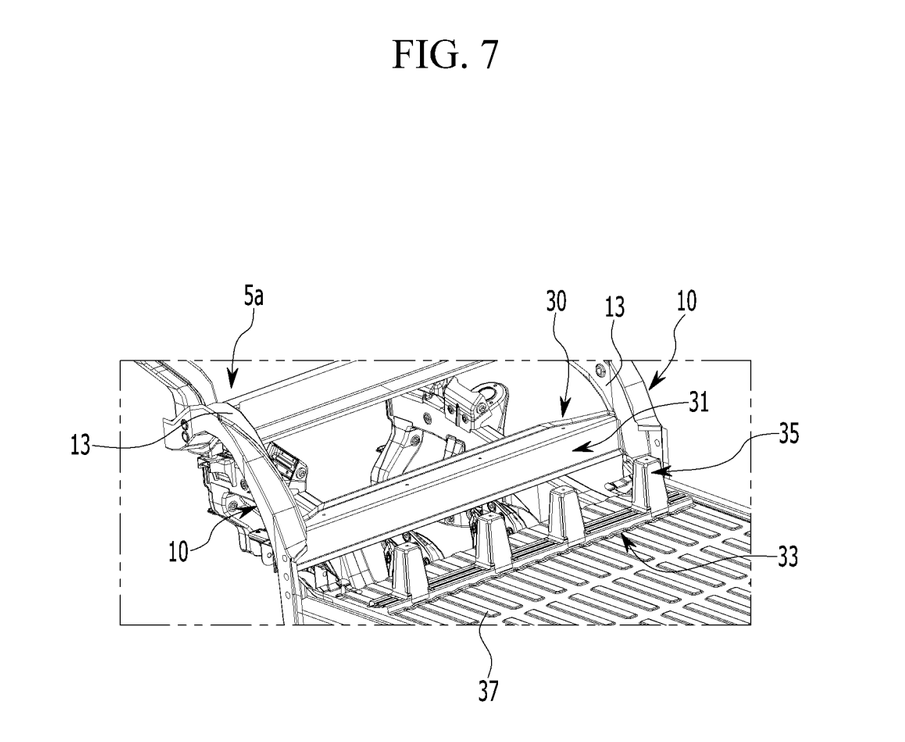

FIG. 6 and FIG. 7 are views showing a front seat mount unit applied to a front vehicle body structure according to an embodiment of the present invention.

Referring to FIG. 2 to FIG. 7, the front seat mount unit 30 according to an embodiment of the present invention includes a front seat crossmember 31, a rear seat crossmember 33, and a plurality of seat mounting brackets 35.

The front seat crossmember 31 is designed to mount the rear part of at least one front seat 9 to the front part 5a of the upper body 5. The front seat crossmember 31 is coupled to each front wheel arch member 10 along the vehicle width direction.

In one example, the front seat crossmember 31 is provided in a form of an 'L' cross-section with one side surface facing upward, and the other side surface extending downward from one side surface to face the rear. Both ends of the front seat crossmember 31 may be coupled to the wheel arch inner member 13 of each front wheel arch member 10.

The rear seat crossmember 33 is designed to mount the front part of at least one front seat 9 to the front part 5a of the upper body 5. The rear seat crossmember 33 is coupled to the front part of a center floor panel 37 provided on the upper body 5 along the vehicle width direction. The rear seat crossmember 33 is disposed below the front seat crossmember 31 with a height difference from the front seat crossmember 31.

The rear seat crossmember 33 is attached to the upper surface of the front part of the center floor panel 37. In one example, the rear seat crossmember 33 may be provided in a shape in which both ends according to the vehicle width direction are opened, the upper side is closed, and the lower side is opened.

Figure 8:
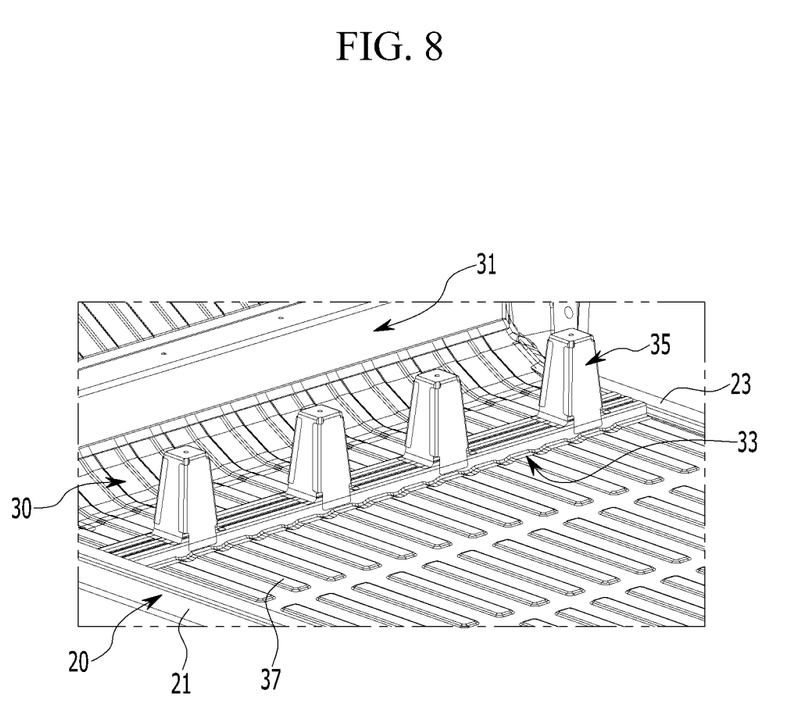
FIG. 8 is a view showing another example of a rear seat crossmember of a front seat mount unit applied to a front vehicle body structure according to an embodiment of the present invention.

The rear seat crossmember 33 in another example, as shown in FIG. 8, may be connected to the upper surface of the front part of the center floor panel 37 and coupled to the sill inner member 23 of each side sill 20. That is, both ends of the rear seat crossmember 33 may be connected to the sill inner members 23, respectively.

Also, a plurality of seat mounting brackets 35 are adapted to compensate for the height difference between the front seat crossmember 31 and the rear seat crossmember 33. That is, a plurality of seat mounting brackets 35 are adapted to keep the front part and the rear part of at least one front seat 9 horizontal. Those skilled in the art also refer to a plurality of seat mounting brackets 35 as 'tower brackets'.

Each of a plurality of seat mounting brackets 35 is coupled to the upper surface of the rear seat crossmember 33 and extends from the upper surface with a height corresponding to the height difference between the front seat crossmember 31 and the rear seat crossmember 33. Each of a plurality of seat mounting brackets 35 is disposed spaced apart along the vehicle width direction.

Each of a plurality of seat mounting brackets 35 may, in one example, be provided in a cup shape with a rectangular hollow cross-section of which the upper side is closed and the lower side is open. Furthermore, each of a plurality of seat mounting brackets 35 may be provided with a shape in which the area of the lower side is larger than the area of the upper side.

Figure 9:
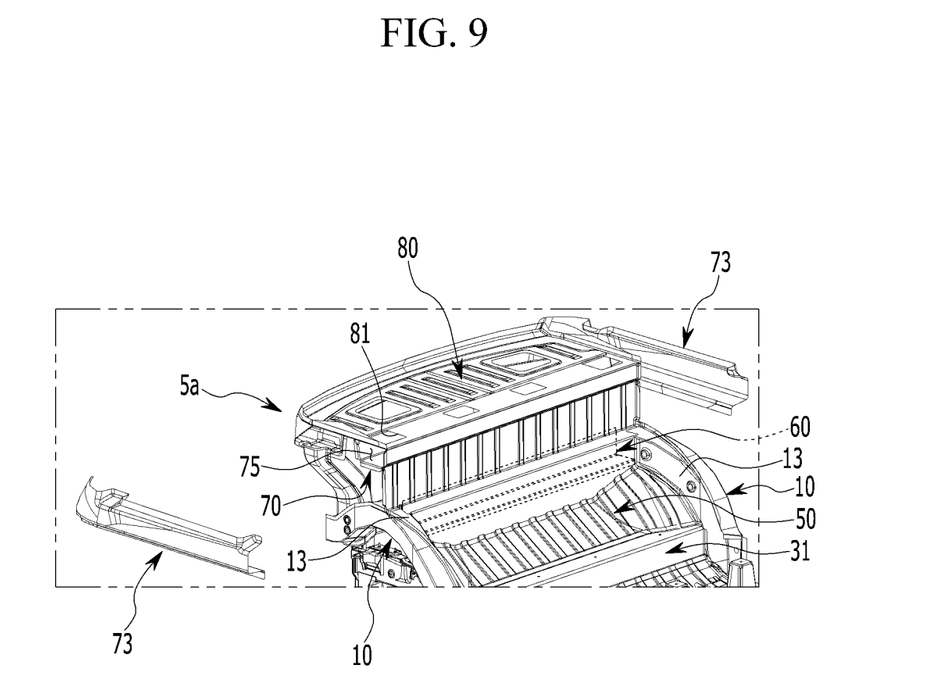
FIG. 9 and FIG. 10 are views showing a dash coupling structure of a front vehicle body structure according to an embodiment of the present invention.
Figure 10:
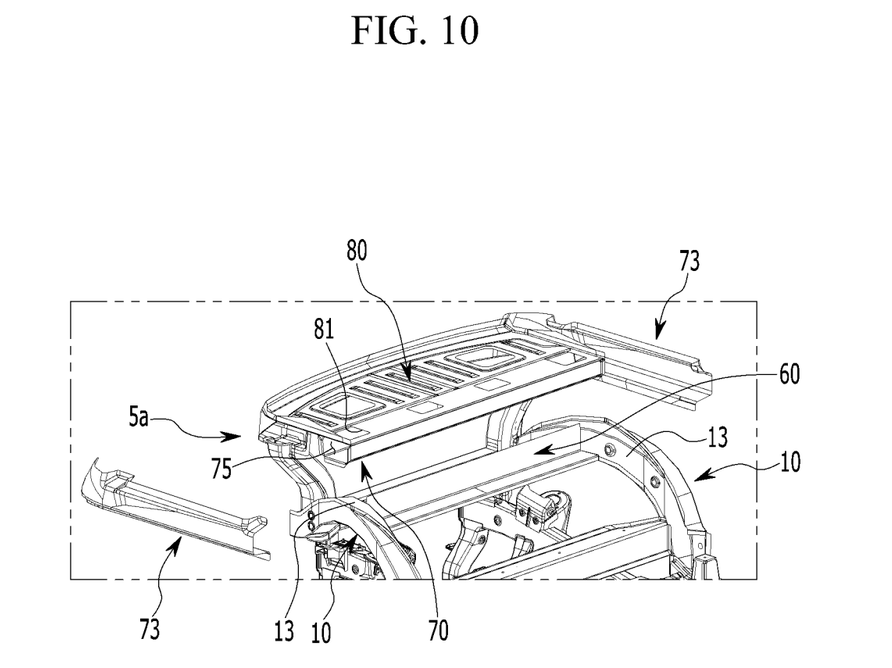

FIG. 9 and FIG. 10 are views showing a dash coupling structure of a front vehicle body structure according to an embodiment of the present invention.

Referring to FIG. 9 and FIG. 10 along with FIG. 2 and FIG. 3, the front vehicle body structure 100 according to an embodiment of the present invention further includes a dash panel 50, a dash crossmember 60, a seat belt crossmember 70, and a cowl panel 80.

In an embodiment of the present invention, the dash panel 50 is coupled to the front part of the center floor panel 37 in the front part 5*a* of the upper body 5. That is, the rear part of the dash panel 50 is connected to the front part of the center floor panel 37.

The dash panel 50 is connected to the wheel arch inner member 13 of each front wheel arch member 10. The front seat crossmember 31 mentioned above is connected to the upper surface (e.g., the rear side) of the dash panel 50.

In an embodiment of the present invention, the dash crossmember 60 is adapted to reinforce the hardness and strength of the dash panel 50. The dash crossmember 60 is coupled to the lower surface (e.g., the front side) of the dash panel 50. The dash crossmember 60 is connected to the wheel arch inner member 13 of each front wheel arch member 10.

In one example, the dash crossmember 60 is provided in the form of an 'L' cross-section of which one surface faces upward, and the other surface extending upward from the one surface faces the rear. Both ends of the dash crossmember 60 may be connected to the wheel arch inner member 13 of each front wheel arch member 10.

In an embodiment of the present invention, the seat belt crossmember 70 is configured to mount the seat belt (not shown) to the front part 5*a* of the upper body 5. The seat belt crossmember 70 is coupled to the upper part of the dash panel 50 along the vehicle width direction.

The seat belt crossmember 70 may be combined with the front cowl support side member 71 disposed along the vehicle body front and rear directions, respectively, on both sides along the vehicle width direction of the front part 5*a* of the upper body 5.

Here, both ends of the seat belt crossmember 70 may be connected to each front cowl support side member 71 through the reinforcing member 73. Each of the reinforcing members 73 is designed to reinforce the hardness along the vehicle body length direction of the front part 5*a* of the upper body 5. Each reinforcing member 73 may be connected to each front cowl support side member 71 and may be connected to both ends of the seat belt crossmember 70.

In one example, the seat belt crossmember 70 may be provided in a shape in which both ends are opened along the vehicle width direction, and the upper and lower sides are closed. The seat belt crossmember 70 includes a seat belt mounting space 75 that opens in the upward direction.

In an embodiment of the present invention, the cowl panel 80 is coupled to each front cowl support side member 71 through each reinforcing member 73 and is coupled to the upper part of the seat belt crossmember 70.

At least one seat belt mount hole 81 is formed in the cowl panel 80. At least one seat belt mount hole 81 is connected to the seat belt mounting space 75 of the seat belt crossmember 70.

Here, in the seat belt mounting space 75 of the seat belt crossmember 70, as shown in FIG. 4, the seat belt retractor go may be installed through at least one seat belt mount hole 81 of the cowl panel 80.

A seat belt retractor 90 is designed to enter and withdraw a seat belt (not shown). Since the seat belt retractor 90 is well known to those skilled in the art, a detailed description is omitted in this specification.

According to the front vehicle body structure 100 according to an embodiment of the present invention as described so far, at least one front seat 9 facing the rear is mounted on the front part 5*a* of the upper body 5 by the front seat mount unit 30.

In addition, the front vehicle body structure 100 according to an embodiment of the present invention includes a front wheel arch member 10 that is directly connected along the front and rear direction of the vehicle body to the side sills 20.

Also, the front vehicle body structure 100 according to an embodiment of the present invention includes a reinforcing member 73 that is connected to the front cowl support side member 71 and the seat belt crossmember 70 along the vehicle body front and rear direction.

Furthermore, the front vehicle body structure 100 according to an embodiment of the present invention includes a dash crossmember 60 that is connected to the dash panel 50 along the vehicle width direction together with the front seat crossmember 31 of the front seat mount unit 30.

Further, the front vehicle body structure 100 according to an embodiment of the present invention includes a seat belt crossmember 70 that is connected to the dash panel 50 and the cowl panel 80 along the vehicle width direction.

Therefore, the front vehicle body structure 100 according to an embodiment of the present invention may secure the connection robustness (e.g., the strength and the hardness) of the front part 5*a* of the upper body 5, and may easily distribute the load applied to the front part 5*a* of the upper body 5.

Accordingly, the front vehicle body structure 100 according to an embodiment of the present invention may improve NVH and R&H performance, and forward impact performance of the PBV mounting the front seat 9 of a rear view type on the front part 5*a* of upper body 5.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A front vehicle body structure of a vehicle body, the vehicle body comprising an underbody and an upper body coupled to the underbody, the front vehicle body structure comprising:
    a pair of front wheel arch members respectively disposed on both sides of a front part of the upper body according to a vehicle width direction, wherein each front wheel arch member is directly connected to a front end of a pair of side sills respectively disposed to extend in a vehicle length direction along both sides of the front part of the upper body; and
    a front seat mount unit comprising a front seat crossmember extending along the vehicle width direction and coupled to each of the front wheel arch members.

2. The front vehicle body structure of claim 1, wherein the front seat mount unit is disposed on the front part of the upper body and is configured to mount at least one front seat facing a rear of the vehicle body.

3. A front vehicle body structure of a vehicle body, the vehicle body comprising an underbody and an upper body coupled to the underbody, the front vehicle body structure comprising:
a pair of front wheel arch members respectively disposed on both sides of a front part of the upper body according to a vehicle width direction; and
a front seat mount unit comprising a front seat crossmember extending along the vehicle width direction and coupled to each of the front wheel arch members, wherein the front seat mount unit comprises a rear seat crossmember coupled along the vehicle width direction to a front part of a center floor panel provided on the upper body.

4. The front vehicle body structure of claim 3, wherein each front wheel arch member is directly connected to a front end of a pair of side sills respectively disposed to extend in a vehicle length direction along both sides of the front part of the upper body.

5. The front vehicle body structure of claim 1, wherein each of the front wheel arch members has a closed cross-section comprising a wheel arch outer member and a wheel arch inner member coupled to each other.

6. The front vehicle body structure of claim 3, wherein the rear seat crossmember is coupled to an inner surface of each side sill of a pair of side sills disposed to extend in a vehicle length direction along both sides of the front part of the upper body.

7. The front vehicle body structure of claim 3, wherein the front seat mount unit comprises a plurality of seat mounting brackets coupled to an upper surface of the rear seat crossmember to extend to a predetermined height and disposed to be spaced apart along the vehicle width direction.

8. A front vehicle body structure of a vehicle body, the vehicle body comprising an underbody and an upper body coupled to the underbody, the front vehicle body structure comprising:
a pair of front wheel arch members respectively disposed on both sides of a front part of the upper body according to a vehicle width direction;
a front seat mount unit comprising a front seat crossmember extending along the vehicle width direction and coupled to each of the front wheel arch members;
a dash panel coupled to the front wheel arch members and having an upper surface to which the front seat crossmember is coupled; and
a dash crossmember coupled to a lower surface of the dash panel and coupled along the vehicle width direction to the front wheel arch members.

9. The front vehicle body structure of claim 8, further comprising a seat belt crossmember coupled through reinforcing members to front cowl support side members disposed on both sides of the front part of the upper body along a vehicle length direction and coupled along the vehicle width direction with an upper part of the dash panel.

10. The front vehicle body structure of claim 9, further comprising a cowl panel coupled to the front cowl support side members through the reinforcing members and coupled to an upper part of the seat belt crossmember.

11. The front vehicle body structure of claim 10, wherein a seat belt mounting space opened upward is provided on the seat belt crossmember.

12. The front vehicle body structure of claim 11, further comprising a seat belt retractor provided in the seat belt mounting space through a seat belt mount hole provided in the cowl panel.

13. A vehicle body comprising:
an underbody;
an upper body coupled to the underbody;
a center floor panel provided on the upper body;
a pair of side sills respectively disposed to extend in a vehicle length direction along both sides of a front part of the upper body;
a pair of front wheel arch members respectively disposed on both sides of the front part of the upper body; and
a front seat mount unit comprising a front seat crossmember extending along a vehicle width direction and coupled to each of the front wheel arch members.

14. The vehicle body of claim 13, wherein the front seat mount unit is disposed on the front part of the upper body and is configured to mount at least one front seat facing a rear of the vehicle body.

15. The vehicle body of claim 13, wherein each of the front wheel arch members is directly connected to a front end of a respective one of the side sills.

16. The vehicle body of claim 13, wherein each of the front wheel arch members has a closed cross-section comprising a wheel arch outer member and a wheel arch inner member coupled to each other.

17. The vehicle body of claim 13, wherein the front seat mount unit comprises:
a rear seat crossmember coupled along the vehicle width direction to a front part of the center floor panel, the rear seat crossmember being coupled to an inner surface of each of the side sills; and
a plurality of seat mounting brackets coupled to an upper surface of the rear seat crossmember to extend to a predetermined height and disposed to be spaced apart along the vehicle width direction.

18. The vehicle body of claim 13, further comprising:
a dash panel coupled to the front wheel arch members and having an upper surface to which the front seat crossmember is coupled; and
a dash crossmember coupled to a lower surface of the dash panel and coupled along the vehicle width direction to the front wheel arch members.

19. The vehicle body of claim 18, further comprising:
a seat belt crossmember coupled through reinforcing members to front cowl support side members disposed on both sides of the front part of the upper body along the vehicle length direction and coupled along the vehicle width direction with an upper part of the dash panel; and
a cowl panel coupled to the front cowl support side members through the reinforcing members and coupled to an upper part of the seat belt crossmember.

20. The vehicle body of claim 19, wherein:
a seat belt mounting space opened upward is provided on the seat belt crossmember; and
a seat belt retractor is provided in the seat belt mounting space through a seat belt mount hole provided in the cowl panel.

* * * * *